Figure 1:
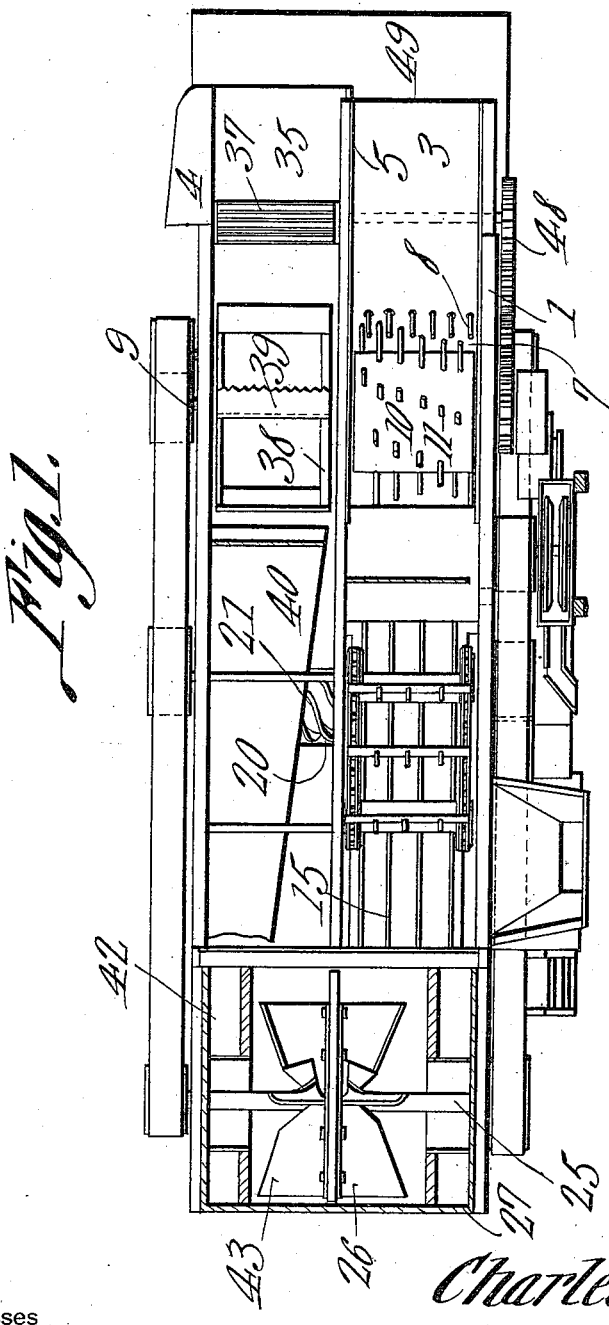

C. BOZILE.
COMBINED VINE THRESHER AND STALK CUTTER.
APPLICATION FILED APR. 16, 1910.

975,603.

Patented Nov. 15, 1910.
3 SHEETS—SHEET 1.

Witnesses

Charles Bozile
Inventor
by
Attorneys

C. BOZILE.
COMBINED VINE THRESHER AND STALK CUTTER.
APPLICATION FILED APR. 16, 1910.
975,603.
Patented Nov. 15, 1910.
3 SHEETS—SHEET 2.
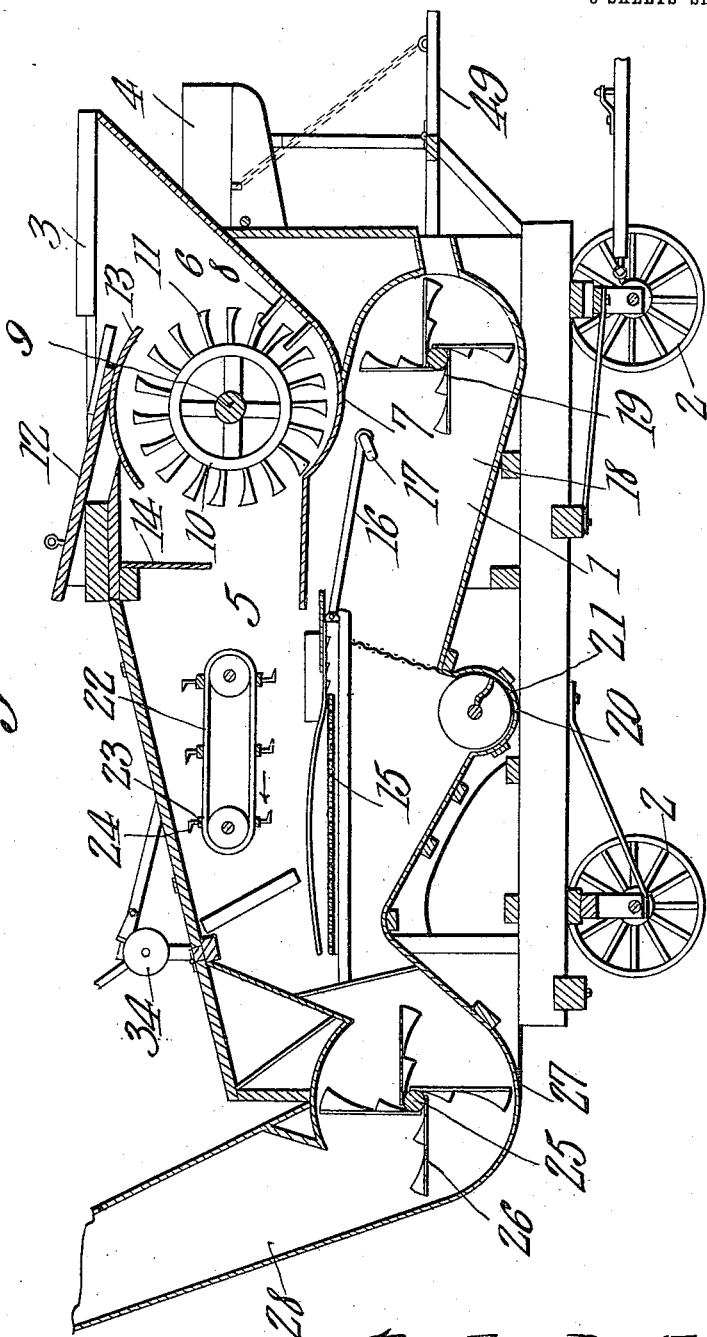
Witnesses
Charles Bozile,
Inventor
by C. A. Snow & Co.
Attorneys

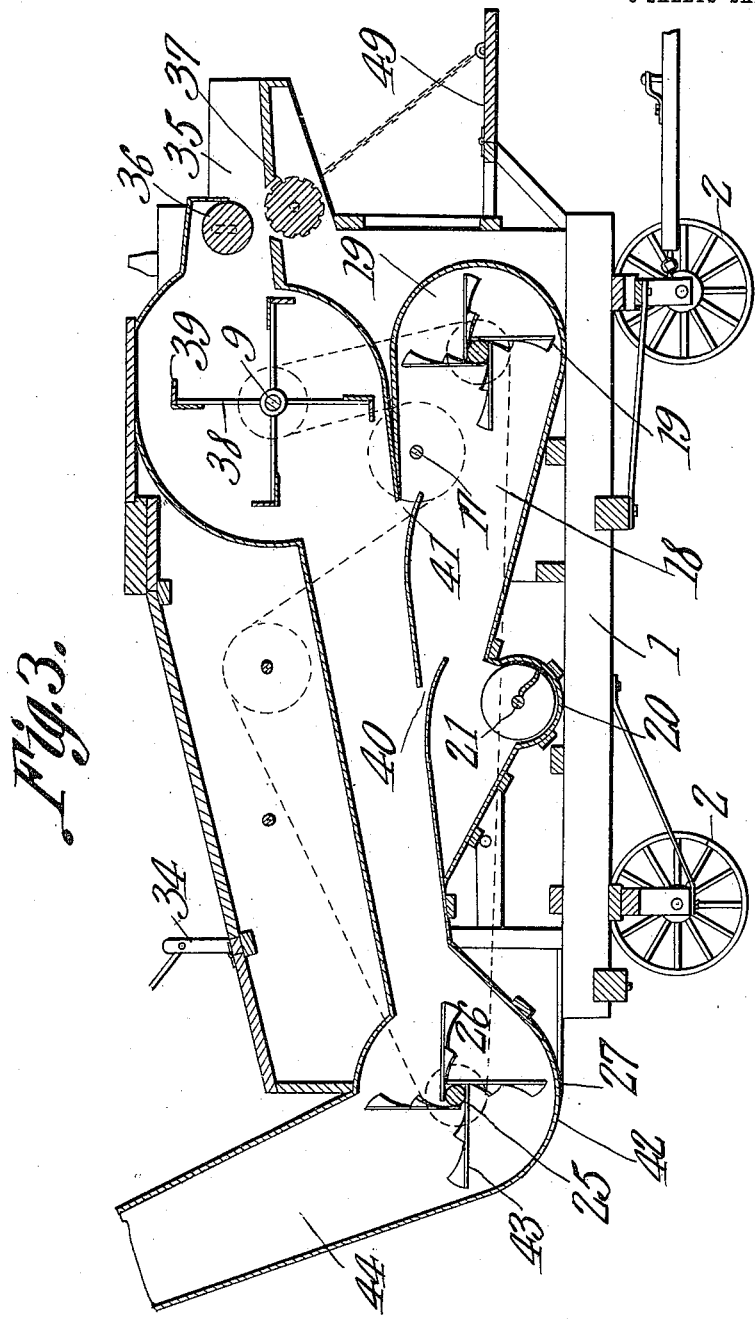

UNITED STATES PATENT OFFICE.

CHARLES BOZILE, OF MANAWA, WISCONSIN, ASSIGNOR OF ONE-HALF TO GEORGE BOZILE, OF MANAWA, WISCONSIN.

COMBINED VINE-THRESHER AND STALK-CUTTER.

975,603.  Specification of Letters Patent.  Patented Nov. 15, 1910.

Application filed April 16, 1910. Serial No. 555,790.

*To all whom it may concern:*

Be it known that I, CHARLES BOZILE, a citizen of the United States, residing at Manawa, in the county of Waupaca and State of Wisconsin, have invented a new and useful Combined Vine-Thresher and Stalk-Cutter, of which the following is a specification.

This invention relates to a combined vine thresher, stalk cutter and it consists in the novel construction and arrangement of its parts as hereinafter shown and described.

In many sections it is a common practice during the raising of a crop of corn to plant beans in the hills at the time or subsequent to the time that the corn is planted and as the corn stalks grow the bean vines coil about the same and the stalks are thus utilized as means for supporting the bean vines above the surface of the ground. At the time that these two crops are harvested more or less difficulty is experienced owing to the fact that the bean vines entangle the growth and frequently they have to be separated from the corn stalks in order to get at the ears of corn upon the stalks. This tearing apart of the material results in more or less waste as both the vines and the fodder upon the stalks possess value as feed or ensilage.

It is the object of the present invention to provide a combined machine especially adapted to handle the mixed material stated in such manner that the material may be cut and delivered to the machine in a tangled state and the machine will assist materially in separating the vines from the stalks while the ears may be readily removed from the stalks during the said process of separation. The machine is also provided with an air blast means adapted to act in common with the stalk and vine handling means.

In the accompanying drawings;—Figure 1 is a plan view of the machine with parts removed. Fig. 2 is a vertical longitudinal sectional view through the vine handling portion of the machine. Fig. 3 is a vertical longitudinal sectional view through the stalk handling portion of the machine.

The machine consists of a body 1 which is mounted upon supporting wheels 2 in a manner similar to that usually employed for mounting the body of a grain thresher. The body is provided at its receiving end with suitable tables preferably hingedly connected to the body and of which the tables 3 and 4 illustrated in the drawings may be accepted as samples. The body 1 is divided longitudinally by means of a partition 5 having located at one side the vine handling parts and at the other side the stalk handling parts and at points as will be explained hereinafter parts which act in common with both the vine handling and stalk handling parts.

A description will first be given of the vine handling parts. The body 1 is provided at its receiving end with a throat 6, which in turn is provided with a concaved bottom 7. Teeth 8 are arranged upon the concave 7 and a shaft 9 is journaled in the said body and extends transversely across the said throat 6. A cylinder 10 is mounted upon the shaft 9 and is provided upon its periphery with teeth 11. The teeth 8 and 11 and the arrangement of the concave 7 and the cylinder 10 is similar to the arrangement of corresponding parts in an ordinary grain thresher. A sliding gate 12 is located over the inlet to the throat 6 and may be adjusted to increase or diminish the transverse area of the passageway through the said throat. A convexed plate 13 is located over the upper portion of the cylinder 10 and is so disposed as to prevent material from passing from the throat 6 into the body 1 over the top of the said cylinder. A cloth or canvas 14 is secured at its upper edge to the top of the body 1 and is located within the same immediately behind the cylinder 10 and hangs pendent. An approximately horizontal screen 15 is mounted for reciprocation within the body 1 behind the cloth or curtain 14 and is operatively connected by means of a pitman 16, with the crank of a shaft 17 journaled for rotation in the body 1. A wind trunk 18 is formed in the lower portion of the body 1 and extends entirely across the same and a fan 19 is journaled for rotation in said trunk and is adapted to drive a blast of air through the same. Upon that side of the body at which the vine handling parts are located the wind trunk 18 is adapted to deliver the air under the screen 15 or through the same. A bean trough 20 is formed in the bottom of the wind trunk 18 and extends entirely across the body 1 of the machine. A worm auger 21 is journaled for rotation in the said trough 20. A shaft 25 is journaled for rotation at the delivery end of the body 1 and a fan 26 is mounted thereon. A casing 27 incloses the fan 26 and is provided with an inlet which communicates with the interior of the body 1 and through which the blast of air from the wind trunk 18 may pass into the said casing and is acted upon by the fan 26. A discharge trunk 28 also communicates with the casing 27.

To describe the operation of the parts for handling the vines let it be presumed that the entangled vines are passed into the throat 6 and are caught up by the teeth 11 which are rotating about the axis of the shaft 9. The vines are drawn down by the teeth 11 between the teeth 8 and are torn asunder. The shaft 9 rotates at a relatively fast rate of speed and while the vines are not reduced to shreds they are torn and broken into comparatively short lengths, that is to say in lengths not too long to be advantageously used for ensilage. The torn material as it passes from the rear edge of the concave 7 is thrown against the curtain 14 by centrifugal action of the cylinder 10 and the bean pods are ruptured or cracked. The material then passes upon the screen 15. In the mean time the screen 15 is maintained in a state of reciprocation and a blast of air is being discharged by the fan 19 through the wind trunk 18 under the said screen. As the material passes over the screen the beans will drop through the same into the trough 20 and will be moved through the said trough by means of the worm 21. The material that enters the casing 27 is acted upon by the fan 26 and forced or blown up through the trunk 28.

The following is a description of the stalk handling parts of the machine. A throat 35 is provided at the receiving end of the body 1 adjacent the throat 6 heretofore described. Upper and lower feed rolls 36 and 37 are journaled for rotation in the throat 35, the lower roll 37 having a serrated or roughened periphery. The shaft 9 heretofore described extends transversely across the throat 35 and in the said throat 35 is provided with radially disposed arms 38 which carry chopping blades 39. The throat 35 communicates with a downwardly disposed chute 40 having in its bottom openings 41 through which air may enter from the wind trunk 18 heretofore described. The chute 40 communicates with a casing 42 (similar to the casing 27, before described) and the shaft 25 extends transversely across the said casing 42. A fan 43 is mounted upon the shaft 25 and is located within the said casing 42. The fan 43 is duplicate of the fan 26 hereinbefore described. The casing 42 communicates with a trunk 44 which is parallel with the trunk 28.

The operation of the stalk handling part is as follows. The stalks are passed between the feeder rolls 36 and 37 and the said feeder roll 37 is maintained in a state of rotation through a train of gear wheels 48 communicating with the shaft 9. From the said feeder rolls the stalks are passed back in through the throat 35 and are engaged by the chopping blades 39 and reduced to sections. The material thus chopped passes down the chute 40 and is caught up by the blast of air entering the said chute from the wind trunk 18 through the openings 41 and is carried into the casing 42. In the casing 42 the material is operated upon by the fan 43 which forces and blows the same up the trunk 44.

The material is fed to the vine handling and stalk handling parts by an operator or operators who stand upon the platform 49 provided at the receiving end of the body 1. The stalks and vines are cut at the same time in the field and are thrown in a tangled condition into a wagon and brought to the machine. At the machine the butt ends of the stalks may be projected between the feeding rolls 36 and 37 and as the stalks are drawn between the rolls the vines carried thereby may be passed over into the throat 6 and as soon as the vines are caught by the teeth 11 upon the cylinder 10, the said teeth strip the vines from the stalks. As the ears of corn approach the feeding rolls 36 and 37 they are grasped by an operator and broken from the stalks. Thus the machine assists in separating the vines from the stalks prior to operating upon the same in the manner indicated.

Therefore it will be seen that a machine is provided which in a measure will assist in separating the vines from the stalks and after this is done the said vines and stalks are reduced to ensilage. At the same time, the corn and beans are recovered. Therefore, with the use of this machine considerable time and labor is saved in the harvest field for the reason that the vines and stalks may be cut without regard as to how they are to be separated and may be loaded in an indiscriminate manner upon a wagon and carried to the machine which will assist in the separation as above described.

Having described the invention what I claim as new and desire to secure by Letters Patent is:—

1. A machine of the character indicated comprising a body, a stalk handling means, a vine handling means, an air blast device adapted to act in common for supplying air to both the stalk handling and vine handling means, and delivery chutes for the vines and stalks and means common to the stalk handling means and vine handling means for carrying the material through said delivery chute.

2. In a machine of the character indicated comprising a body, a partition located in the body and dividing the same into adjacent throats, a stalk handling means located in one throat, a vine handling means located in the other throat, the edge of said partition adapted to serve as means for separating intertwined vines from stalks when portions of the vines and portions of the stalks are fed to their respective handling means, an air blast device adapted to act in common to deliver blasts of air to the material passing from both of said throats, and delivery chutes adapted to receive said material and means for forcing the material through said delivery chutes.

In testimony that I claim the foregoing as my own, I have hereto affixed by signature in the presence of two witnesses.

CHARLES BOZILE.

Witnesses:
   Chas. W. Ross,
   H. P. Piotter.